(12) United States Patent
Shea et al.

(10) Patent No.: US 9,025,299 B2
(45) Date of Patent: May 5, 2015

(54) TRIGGERED ARC FLASH ARRESTER AND SHIELD ELEMENT FOR USE THEREWITH

(71) Applicant: Eaton Corporation, Cleveland, OH (US)

(72) Inventors: John Joseph Shea, Pittsburgh, PA (US); Ganesh K. Balasubramanian, Horseheads, NY (US); Paul J. Rollmann, Brown Deer, WI (US); Robert Kirkland Smith, Ithaca, NY (US)

(73) Assignee: Eaton Corporation, Cleveland, OH (US)

( * ) Notice: Subject to any disclaimer, the term of this patent is extended or adjusted under 35 U.S.C. 154(b) by 90 days.

(21) Appl. No.: 13/860,643

(22) Filed: Apr. 11, 2013

(65) Prior Publication Data

US 2014/0307350 A1 Oct. 16, 2014

(51) Int. Cl.
*H02H 9/06* (2006.01)
*H01T 2/02* (2006.01)
*H02H 9/04* (2006.01)

(52) U.S. Cl.
CPC .. *H01T 2/02* (2013.01); *H02H 9/06* (2013.01); *H02H 9/046* (2013.01)

(58) Field of Classification Search
CPC .................................. H01T 2/02; H02H 9/046
USPC .......................................................... 361/120
See application file for complete search history.

(56) References Cited

U.S. PATENT DOCUMENTS 3,811,070 A * 5/1974 Voshall .......................... 315/150
4,553,007 A * 11/1985 Wayland ........................ 218/136
7,821,749 B2 * 10/2010 Asokan et al. ..................... 361/1

* cited by examiner

*Primary Examiner* — Scott Bauer
(74) *Attorney, Agent, or Firm* — Eckert Seamans Cherin & Mellott, LLC; Brij K. Agarwal

(57) ABSTRACT

An improved triggered arc flash arrester includes a shield apparatus disposed within an interior of an evacuated envelope and includes a first shield element and a second shield element. A plurality of conductors are partially disposed within the interior and are separated from one another by a gap. A first element of the shield apparatus is situated adjacent the envelope and is structured to protect the envelope from damage due to the high temperature plasma that results from an arc across the gap. A second element of the shield apparatus is interposed between the gap and at least a portion of the first element and is structured to protect the at least portion of the first element from damage due to an arc across the gap.

11 Claims, 1 Drawing Sheet

TRIGGERED ARC FLASH ARRESTER AND SHIELD ELEMENT FOR USE THEREWITH

BACKGROUND

1. Field

The disclosed and claimed concept relates generally to electrical power distribution equipment and, more particularly, to a triggered arc flash arrester.

2. Related Art

Electrical power distribution equipment is generally understood in the relevant art and includes, among other devices, circuit interrupters and other equipment that can interrupt the delivery of current to a protected portion of a circuit. Such power distribution equipment typically also includes switchgear that often comprises electrical busways, electrical disconnects, fuses, and other devices which are located inside a metal enclosure that is connected to electrical ground and which are configured to enable the disconnection of electrical equipment. Such equipment is generally well suited to interrupt the flow of current to a protected portion of a circuit during certain predefined overcurrent conditions, under-voltage conditions, and other conditions. While such equipment has been generally effective for its intended purposes, it has not been without limitation.

For instance, multi-phase AC electrical distribution equipment can sometimes be subject to arcing faults between phases, and such arcing faults can occur at various locations within switchgear cabinets, such as between power buses, or between a power bus and a grounded metal component, by way of example. Such arcing faults can result from tools, animals, water, or other foreign materials becoming situated between a pair of different electrical phases or between an electrical phase and a grounded metal component. Such arcing faults can produce high energy gases which can be extremely dangerous to equipment and nearby personnel. It thus has been known to provide triggered arc flash arresters that include a pair of spaced conductors within an evacuated envelope and that are structured to be triggered to change state in one fashion or another. Upon such a change in state, the triggered arc flash arrester can support an arc between the spaced conductors for a short period of time to commutate the arcing fault into the vacuum vessel and enable an upstream circuit interrupter to interrupt the power that is feeding the arc fault. Triggered arc flash arresters and switchgear systems that include the same are described generally in U.S. patent application Ser. No. 13/296,765 filed Nov. 16, 20111, the disclosures of which are incorporated herein by reference.

Such triggered arc fault arresters can be electrically connected with a plurality of AC phases in any of a variety of fashions. For instance, the triggered arc flash arrester(s) can be electrically connected between electrical phases wherein, for instance, one conductor of a first triggered arc flash arrester is connected with phase A ($\phi A$) and another conductor of the first triggered arc flash arrester is connected with phase B ($\phi B$). Likewise, one conductor of a second triggered arc flash arrester can be connected with $\phi B$, and another conductor of the second triggered arc flash arrester can be connected to phase C ($\phi C$). Alternatively, each phase may be electrically connected with a conductor of a separate triggered arc flash arrester, with the opposite conductors of each such triggered arc flash arrester being electrically connected together. Still alternatively, the opposite conductors that are electrically connected together can additionally be grounded.

While such triggered arc flash arresters have been generally effective for their intended purposes, they have not been without limitation. As is generally understood in the relevant art, such triggered arc flash arresters maintain an electrical arc between spaced conductors for a short time in order to enable, by way of example, an upstream circuit interrupter to interrupt the current feeding an arcing fault. However, the arc that has been triggered within the triggered arc flash arrester can be extremely powerful and can have a deleterious effect on the evacuated envelope. It thus would be desirable to provide an improved triggered arc flash arrester.

SUMMARY OF THE INVENTION

An improved triggered arc flash arrester includes a shield apparatus disposed within an interior of an evacuated envelope and includes a first shield element and a second shield element. A plurality of conductors are partially disposed within the interior and are separated from one another by at least a first gap. A first element of the shield apparatus is situated adjacent the envelope and is structured to protect the envelope from damage due to the high temperature plasma that results from an arc across the at least first gap. A second element of the shield apparatus is interposed between the at least first gap and at least a portion of the first element and is structured to protect the at least portion of the first element from damage due to an arc across the gap. The second element can be formed from a different material than the first element as needed in order to increase the degree of protection to the first element. The second element in combination with the first element increases the overall thickness of the shield apparatus in a direction generally between the at least first gap and the envelope in order to provide a relatively greater degree of protection to the envelope than would be provided by the first element alone. The combined first and second elements enable the improved triggered arc flash arrester to withstand a relatively greater number of arc events than previously known triggered arc flash arresters and/or enable the improved triggered arc flash arrester to withstand an arc event for a relatively greater duration of time.

Accordingly, an aspect of the disclosed and claimed concept is to provide an improved triggered arc flash arrester that provides better protection from arc damage to the envelope.

Another aspect of the disclosed and claimed concept is to provide an improved triggered arc flash arrester that can withstand a relatively greater number of arcing events than previously known triggered arc flash arresters.

Another aspect of the disclosed and claimed concept is to provide an improved triggered arc flash arrester that can provide protection to an evacuated envelope for a greater duration of time than previously known triggered arc flash arresters.

These and other aspects of the disclosed and claimed concept are provided by an improved triggered arc flash arrester, the general nature of which can be stated as including an envelope formed with an interior having a reduced pressure therein. A plurality of conductors are partially disposed within the interior and are separated from one another by at least a first gap situated between the plurality of conductors within the interior. The plurality of conductors are structured to support an arc across the at least first gap that is electrically in parallel with an arc fault and that facilitates extinguishing of the arc fault. A shield apparatus is disposed within the interior and is situated generally between the at least first gap and the envelope. The shield apparatus can be generally stated as including a first shield element situated adjacent the envelope and being structured to protect the envelope from damage due to the arc across the at least first gap. The shield apparatus can be further stated as including a second shield element situated generally between the at least first gap and at least a portion of the first shield element and being structured to protect the at least portion of the first shield element from damage due to the arc across the at least first gap

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
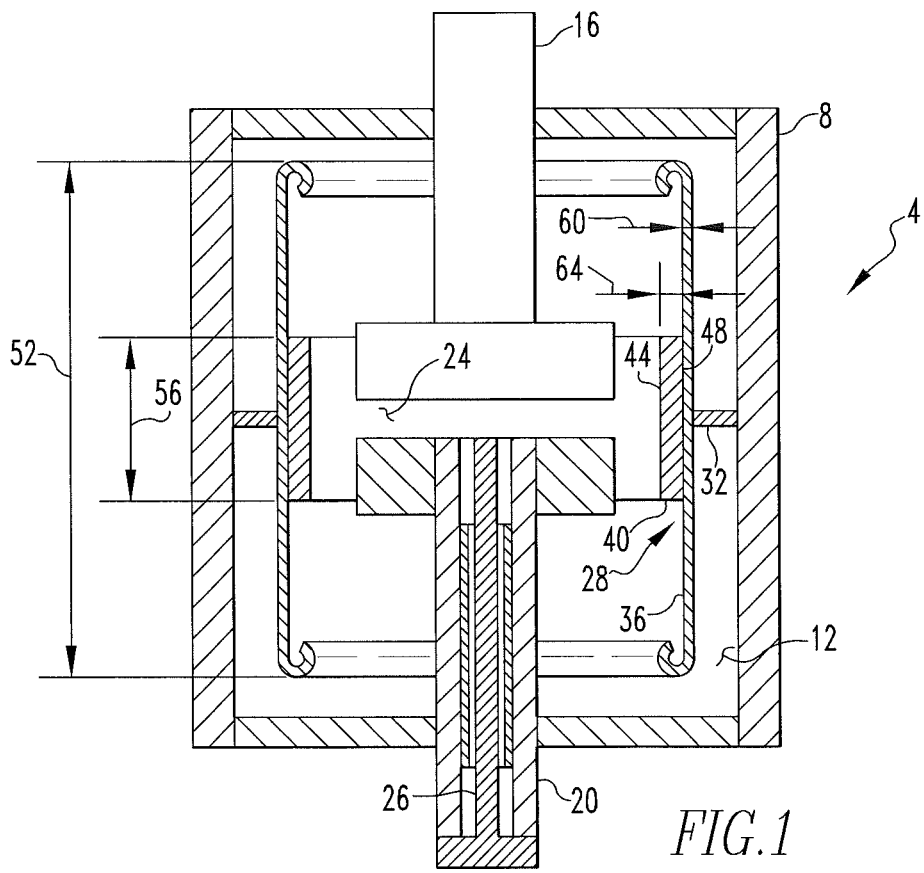
FIG. 1 is a schematic cut away view of an improved triggered arc flash arrester in accordance with the disclosed and claimed concept.

An improved triggered arc flash arrester 4 in accordance with the disclosed and claimed concept is depicted generally in FIG. 1 in a schematic and cut away fashion. The triggered arc flash arrester 4 can be said to include an envelope 8 having an interior 12 that is evacuated. That is, the interior 12 has a reduced pressure therein that is below that of the atmospheric pressure at the exterior of the envelope 8. The triggered arc flash arrester 4 further includes a first conductor 16 and a second conductor 20, both of which extend partially within the interior 12 of the envelope 8 and which also extend through the envelope 8 to the exterior thereof. The first and second conductors 16 and 20 are separated from one another such that a gap 24 can be said to exist and to be situated generally between the first and second conductors 16 and 20. The second conductor 20 is depicted as additionally including a schematically depicted triggering device 26 that is configured in any of a variety of fashions to break down the dielectric that exists between the first and second conductors 16 and 20, generally at the gap 24, in order to cause an electrical arc to form between the first and second conductors 16 and 20 in the event of an arcing fault in parallel with the first and second conductors 16 and 20. The first and second conductors 16 and 20 can be connected with components within the electrical power system, such as in the exemplary and non-limiting way in which the first conductor 16 is connected with phase A (φA) of an electrical power system and the second conductor 20 is connected with phase B (φB) of the electrical system.

The triggered arc flash arrester 4 additionally includes a shield apparatus 28 that is situated within the interior 12 and which is structured to protect the inboard surface of the envelope 8, i.e., the surface thereof that is situated adjacent the interior 12, from damage due to an electrical arc across the gap 24. The shield apparatus 28 in the depicted exemplary embodiment includes a support 32 that is situated on the envelope 8, a first shield element 36 that is disposed on the support 32, and a second shield element 40 that is disposed on the first shield element 36.

Figure 2:
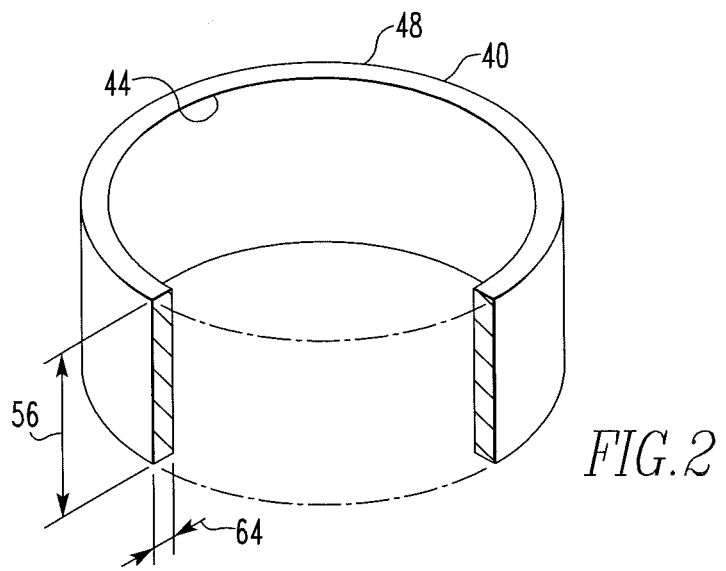
FIG. 2 is a schematic view of a portion of an improved shield apparatus of the triggered arc flash arrester of FIG. 1.

In the depicted exemplary embodiment, the first and second shield elements 36 and 40 are separate structures, and it is noted that the second shield element 40 itself is depicted generally in FIG. 2 in a partially cut away fashion. The second shield element 40 can be said to include an inboard surface 44 that is situated generally adjacent the gap 24 and to further include an outboard surface 48 that is opposite the inboard surface 44 and that is situated generally adjacent the first shield element 36. Further in the depicted exemplary embodiment, the first shield element 36 is formed at least partially of a ferrous material and may be, by way of example, 304 stainless steel or other appropriate material. The second shield element 40 in the depicted exemplary embodiment is formed of a second, different material such as a composite or alloy of copper and chromium, copper and tungsten, nickel, and the like without limitation, although other materials can be employed without departing from the present concept.

In the depicted exemplary embodiment, and as set forth above, the first and second shield elements 36 and 40 are separate components, and the second shield element 40 is disposed on and supported on the first shield element 36 in any of a variety of fashions appropriate to the materials from which the first and second elements 36 and 40 are formed and that are appropriate to the environment within the envelope 8. By way of example, the second shield element 40 can be supported on the first shield element 36 by welding, riveting, or through the use of mechanical interconnection such as an interference fit therebetween or through the use of engagement structures that resist axial and/or radial movement of the second shield element 40 with respect to the first shield element 36, by way of example. It is noted, however, that any other appropriate type of attachment or connection methodology may be employed without departing from the present concept.

It is also noted that in other embodiments the first and second shield elements 36 and 40 can be co-formed as a single piece element substantially without joints therebetween. In such a scenario, the first and second shield elements 36 and 40 would typically be formed of the same material.

As can be understood from FIG. 1, the first shield element 36 extends a first distance 52 along the interior 12 of the envelope 8 adjacent the inboard surface of the envelope 8 and extending generally between the envelope 8 and the first and second conductors 16 and 20 (as well as along the gap 24). It likewise can be seen from FIG. 1 that the second shield element 40 extends a second distance 56 along the first shield element 36 and situated generally between the first shield element 36 and the gap 24.

It can also be seen that the second distance 56 is shorter than the first distance 52. In this regard, the material from which the second shield element 40 is formed may be more costly than the material from which the first shield element 36 is formed, potentially many times more costly. In the absence of the second shield element 40, the first shield element 36 would be adjacent any arc that might be formed between the first and second conductors 16 and 20, with a potentially deleterious effect on the first shield element 36 if it is formed of, by way of example, 304 stainless steel. However, by providing the second shield element 40 in the immediate vicinity of the gap 24 and situated generally between the gap 24 and the first shield element 36, the second shield element 40 can be said to protect the first shield element 36 by reducing the effect on the first shield element 36 of the high temperature plasma that is generated as a result of an arc that may be formed across the gap 24. The high temperature plasma that results from an arc across the gap 24 is at its greatest intensity immediately adjacent the gap 24 and is relatively reduced in intensity with increased distance from the gap 24. As such, the provision of the second shield element 40 in the immediate vicinity of the gap 24 reduces the deleterious effect on the first shield element 36 that otherwise might result from an arc across the gap 24. Furthermore, cost savings can be achieved by limiting the relatively more expensive materials from which the second shield element 40 is formed by configuring the second shield element 40 to be situated in the immediate vicinity of the gap 24, as is indicated along the second distance 56. This has the effect of concentrating in the vicinity of the gap 24 the protection afforded by the second shield element 40.

Furthermore, the first shield element 36 can be said to be of a first thickness 60 in a direction between the gap 24 and the envelope 8, and the second shield element 40 can likewise be said to be of a second thickness 64 in the same direction. The combined protective material thickness between the gap 24 and the envelope 8 in the immediate vicinity of the gap 24 can thus be said to be the first thickness 60 in combination with the second thickness 64. The combined first and second thicknesses 60 and 64 advantageously reduce the deleterious effect on the envelope 8 that otherwise might occur in the absence of the second shield element 40 since the increased material thickness it provides enables the envelope 8 and the triggered arc flash arrester 4 to better withstand the effects of an arc across the gap 24. As such, the triggered arc flash arrester 4 is able to withstand an arc across the gap 24 that is of a relatively longer duration than would be possible in the absence of the second shield element 40. Moreover, the triggered arc flash arrester 4 can withstand a relatively greater number of arc cycles, i.e., incidents of the formation of an electrical arc across the gap 24 until current is interrupted, say, by an upstream circuit interrupter, which is likewise desirable.

It is understood, however, that in other embodiments the shield apparatus 28 potentially could be formed to have a relatively consistent thickness along the first distance 52 that is greater than the first thickness 60 and could thereby provide improved protection to the envelope 8 compared with what would be provided by the first shield element 36 (as depicted herein) on its own. Such an individual element formed of, for instance, 304 stainless steel would provide enhanced protection to the envelope 8, although it is understood that an even greater degree of protection to the envelope 8 could be provided by forming such a shield element from one of the alloys or materials that are set forth above and from the second shield element 40 may be manufactured.

Moreover, by situating the second shield element 40 relatively closer to the gap 24 than the first shield element 36, the second shield element 40 can be caused to directly undergo the deleterious effects of an arc across the gap 24. However, since the second shield element 40 is advantageously formed of a material that is configured to have a relatively greater ability to withstand the deleterious effects of such an arc, the second shield element 40 provides protection to the first shield element 36, thereby maintaining the integrity of the first shield element 36 and protecting the envelope 8 from the effects of an arc across the gap 24 for a relatively greater number of arc cycles and/or for a relatively greater period of time than would be possible in the absence of the second shield element 40.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof

What is claimed is:

1. A triggered arc flash arrester comprising:
an envelope formed with an interior having a reduced pressure therein;
a plurality of conductors partially disposed within the interior and separated from one another by at least a first gap situated between the plurality of conductors within the interior, the plurality of conductors being structured to support an arc across the at least first gap that is electrically in parallel with an arc fault and that facilitates extinguishing of the arc fault; and
a shield apparatus disposed within the interior and situated generally between the at least first gap and the envelope, the shield apparatus comprising a first shield element situated adjacent the envelope and being structured to protect the envelope from damage due to the arc across the at least first gap, the shield apparatus further comprising a second shield element situated generally between the at least first gap and at least a portion of the first shield element and being structured to protect the at least portion of the first shield element from damage due to the arc across the at least first gap.

2. The triggered arc flash arrester of claim 1 wherein the second shield element is supported on the first shield element.

3. The triggered arc flash arrester of claim 2 wherein the second shield element is disposed on the first shield element.

4. The triggered arc flash arrester of claim 1 wherein the second shield element is generally annular in shape.

5. The triggered arc flash arrester of claim 4 wherein the first shield element extends a first distance along the plurality of conductors, and wherein the second shield element extends a second distance along the plurality of conductors, the second distance being less than the first distance.

6. The triggered arc flash arrester of claim 1 wherein the first and second shield elements are formed of different materials.

7. The triggered arc flash arrester of claim 6 wherein the second shield element is formed at least in part of stainless steel, copper, nickel, chromium, tungsten, or another refractory material.

8. The triggered arc flash arrester of claim 7 wherein the first shield element is formed at least in part of a ferrous material.

9. The triggered arc flash arrester of claim 1 wherein the second shield element is disposed relatively closer to the at least first gap than the first shield element.

10. The triggered arc flash arrester of claim 1 wherein the second shield element is generally interposed between the first shield element and the at least first gap.

11. A shield element structured for use with at least a portion of the triggered arc flash arrester of claim 1, the shield element being situated generally between the at least first gap and at least a portion of the first shield element and being structured to protect the at least portion of the first shield element from damage due to the arc across the at least first gap.

* * * * *